US006535656B1

(12) United States Patent
Noge et al.

(10) Patent No.: US 6,535,656 B1
(45) Date of Patent: Mar. 18, 2003

(54) PLANAR-TYPE POLARIZATION INDEPENDENT OPTICAL ISOLATOR

(75) Inventors: Hiroshi Noge, Yaizu (JP); Hiroki Takahashi, Fukuroi (JP)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/982,572

(22) Filed: Oct. 17, 2001

(51) Int. Cl.[7] .................................................. G02B 6/00
(52) U.S. Cl. ............................. 385/11; 385/14; 385/43; 385/27; 372/703
(58) Field of Search ............................... 385/11, 14, 27, 385/28, 29, 43; 372/703

(56) References Cited

U.S. PATENT DOCUMENTS

| | | | |
|---|---|---|---|
| 4,978,189 A | * 12/1990 | Blonder | 385/35 |
| 5,239,600 A | 8/1993 | Hanada et al. | 385/48 |
| 5,598,492 A | 1/1997 | Hammer | 385/27 |
| 5,694,496 A | 12/1997 | Ando et al. | 385/11 |
| 6,033,470 A | 3/2000 | Fujii et al. | 117/44 |

* cited by examiner

Primary Examiner—James Phan
Assistant Examiner—Leo Boutsikaris
(74) Attorney, Agent, or Firm—Juliana Agon (57) ABSTRACT

A planar-type optical isolator includes a substrate, a first mode splitter, a second mode splitter and a phase shift region formed on the substrate between the first mode splitter and the second mode splitter. The first mode splitter is formed on the substrate and receives an incident optical signal through an input port and splits the incident optical signal into a first incident mode and a second incident mode. The second optical splitter is formed on the substrate and combines a first rotated incident mode and a second rotated incident mode to reform the incident optical signal at an output port. The second mode splitter receives a reflected optical signal on the output port and splits the reflected optical signal into a first reflected mode and a second reflected mode. The phase shift region is formed on the substrate between the first mode splitter and the second mode splitter and includes a nonreciprocal phase shift section and reciprocal phase shift section.

29 Claims, 7 Drawing Sheets

PLANAR-TYPE POLARIZATION INDEPENDENT OPTICAL ISOLATOR

BACKGROUND OF THE INVENTION

1. Field of the Invention

The present invention is generally directed to an optical device and, more specifically, a planar-type polarization independent optical isolator.

2. Technical Background

Optical isolators have been utilized in a variety of optical systems to reduce reflections that adversely effect the operation of the systems, such as by disrupting the oscillation of a laser and/or interfering with in-line optical amplifiers. Known optical isolators use a wide variety of components to achieve optical isolation. Non-planar, optical isolators, for example, typically utilize birefringent crystal plates (e.g., rutiles), half-wave plates and latching garnets or non-latching garnets with external magnets.

Optical circulators have also been utilized in a variety of optical systems to, for example, couple a bidirectional fiber to both an input fiber and an output fiber. Non-planar optical circulators have also generally utilized birefringent crystal plates (e.g., rutiles), half-wave plates and latching or non-latching garnets with external magnets.

A rutile is a birefringent material that typically divides a light ray into at least two orthogonal rays (i.e., an ordinary ray and an extraordinary ray). When implemented in an optical isolator or an optical circulator, at least one rutile normally functions as a walk-off element, with a first rutile typically splitting an incoming optical signal into ordinary and extraordinary component beams and a last (e.g., a second) rutile normally causing the two separate beams to become coincident and reform the original incoming optical signal. When utilized in optical isolators and optical circulators, a latching garnet non-reciprocally rotates the component beams of an input signal, typically, by forty-five degrees and a half-wave plate is generally used to reciprocally rotate the component beams an additional forty-five degrees.

Due to the recent increase in demand for optical isolators and optical circulators, to be used with dense wavelength division multiplexing (DWDM) systems, reducing the size and cost of optical isolators and optical circulators has become increasingly important. As such, it would be desirable to develop practical planar-type optical devices (e.g., optical isolators and optical circulators) that are fabricated using standard semiconductor manufacturing techniques.

SUMMARY OF THE INVENTION

An embodiment of the present invention is directed to a planar-type optical isolator that includes a substrate, a first mode splitter, a second mode splitter and a phase shift region formed on the substrate between the first mode splitter and the second mode splitter. The first mode splitter is formed on the substrate and receives an incident optical signal through an input port and splits the incident optical signal into a first incident mode and a second incident mode. The second mode splitter is formed on the substrate and combines a first rotated incident mode and a second rotated incident mode to reform the incident optical signal at an output port. The second mode splitter receives a reflected optical signal on the output port and splits the reflected optical signal into a first reflected mode and a second reflected mode. The phase shift region is formed on the substrate between the first mode splitter and the second mode splitter and includes a nonreciprocal phase shift section and reciprocal phase shift section. The phase shift region passes the reflected optical signal without altering its modes, while causing the first incident mode to become the second rotated incident mode and the second incident mode to become the first rotated incident mode. The first mode splitter directs the first reflected mode and the second reflected mode away from the input port.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT(S)

A planar-type optical isolator includes a substrate, a first mode splitter formed on the substrate, a second mode splitter formed on the substrate and a phase shift region formed on the substrate between the first mode splitter and the second mode splitter. The mode splitters of the planar-type optical isolator have a relatively large branching angle (about seven degrees), compared to conventional Y-branch beam splitters (less than one degree). Advantageously, the planar-type optical isolator provides polarization independent optical isolation with low insertion loss (e.g., less than about 0.2 dB for both TE and TM modes at 1550 nanometers) and low cross-talk (e.g., reduction greater than 40 dB), in a relatively small device footprint (overall length less than about 1200 microns). The drawings of the preferred isolator are not to scale and various dimensions and angles of the components have been exaggerated for illustrative purposes.

Figure 1:
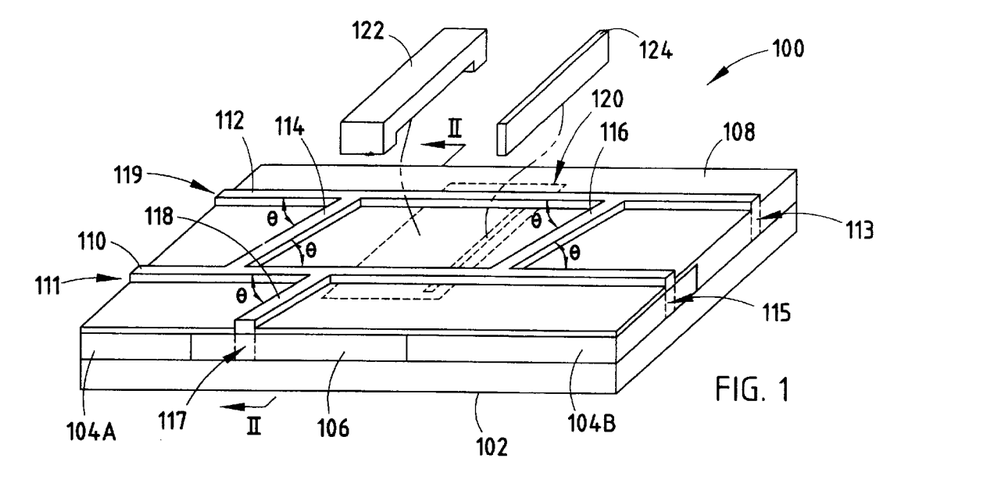
FIG. 1 is a perspective partly exploded view of a planar-type optical isolator, according to an embodiment of the present invention.
Figure 5A:
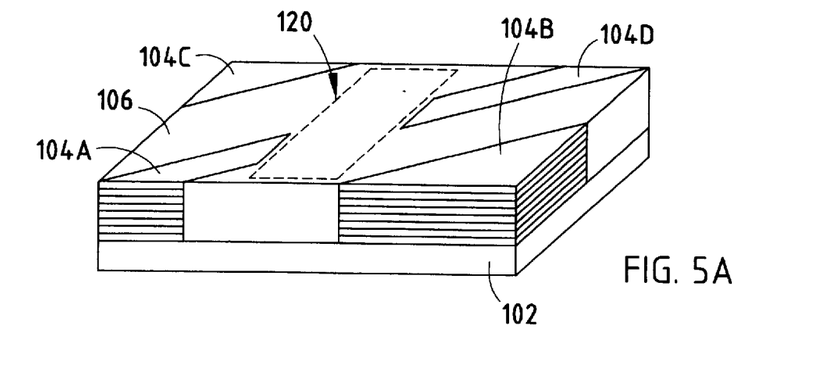
FIGS. 5A–5E are perspective views of the isolator of FIG. 1 during various stages of fabrication.
Figure 5B:
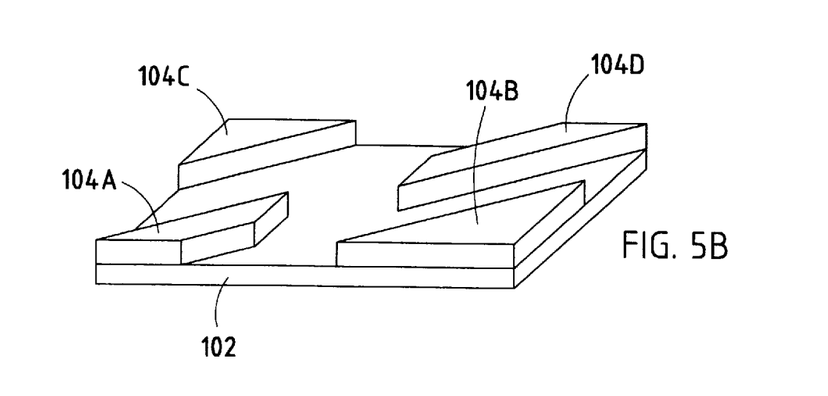

Referring initially to FIG. 1, a planar-type optical isolator 100 is shown that provides optical isolation, according to an embodiment of the present invention. The isolator 100 includes a substrate 102, preferably a gadolinium gallium garnet (GGG) substrate (e.g., $Gd_3Ga_5O_{12}$) that is about five-hundred microns thick, upon which the components of the isolator 100 are formed. It should be appreciated that other types of substrates, e.g., SGG and NGG, may be utilized. As is best shown in FIG. 5B, a plurality of multiple quantum well (MQW) structures 104A–104D are formed on the substrate 102. Preferably, the materials for the MQW structures 104A–104D are chosen such that the effective refractive index for the TE mode propagating into the MQW structures 104A–104D is the same as that of the refractive index for core layer 106. This results in an effective refractive index for the TM mode that is smaller than the refractive index of the core layer 106, which causes the TM mode to diverge at each of the MQW structures 104A–104D.

A first MQW structure 104A (FIG. 1) is separated from a third MQW structure 104B by the core layer 106 (i.e., a magneto-optic material). Preferably, the core layer 106 is formed of cerium substituted yttrium iron garnet (Ce:YIG) material, which is about nine-hundred nanometers thick and each of the MQW structures 104A–104D preferably includes thirty total multiple alternating Ce:YIG and silicon oxide ($SiO_2$) layers that are about thirty nanometers thick. A cladding layer 108 (i.e., a nonmagnetic material) is formed over the MQW structures 104A–104D and the core layer 106. The cladding layer 108 includes a number of ribs 110, 112, 114, 116 and 118 for guiding at least a portion of an incident optical signal and a reflected optical signal. Preferably, the ribs 110–118 have a width between about five and seven microns and a height of about fifty nanometers and an overall thickness of the cladding layer 108 is about one-hundred fifty nanometers.

A first rib 110 and a second rib 112 are joined by a first crossover rib 114 on a first side of a phase shift region 120 and by a second crossover rib 116 on a second side of the phase shift region 120. The branching angle θ between the first rib 110 and the first and second crossover ribs 114 and 116 is preferably about seven degrees. Likewise, the branching angle θ between the second rib 112 and the first and second crossover ribs 114 and 116 is preferably about seven degrees. An input port 111 is located in the core layer 106 beneath a first end of the first rib 110 and a first rib exit port 115 is located in the core layer 106 beneath a second end of the first rib 110. The second rib 112 includes a second rib exit port 119 that is located in the core layer 106 beneath a first end of the second rib 112 and an output port 113 that is located in the core layer 106 beneath a second end of the second rib 112. In a preferred embodiment, a magnet 122 is formed over the first rib 110 and the second rib 112 to create a nonreciprocal phase shift section 120A (see FIG. 3) in the core layer 106 that nonreciprocally rotates an incident optical signal and a reflected optical signal by about forty-five degrees. Preferably, the magnet 122 is formed by two magnetic film areas with a length Lm of about one-hundred microns and a width Lw between five and ten microns (see FIG. 6A).

Preferably, a polyimide halfwave plate 124 is incorporated (e.g., buried) within the core layer 106 to provide a reciprocal phase shift section 120B (see FIG. 3) that reciprocally rotates an incident optical signal and a reflected optical signal by about forty-five degrees. A suitable polyimide halfwave plate is manufactured and made commercially available by NTT-AT. As will be appreciated, the nonreciprocal phase shift section 120A rotates both an incident optical signal and a reflected optical signal in the same direction (e.g., clockwise) and the reciprocal phase shift section 120B rotates an incident optical signal in one direction (e.g., clockwise) and a reflected optical signal in the opposite direction (e.g., counterclockwise).

Figure 2A:
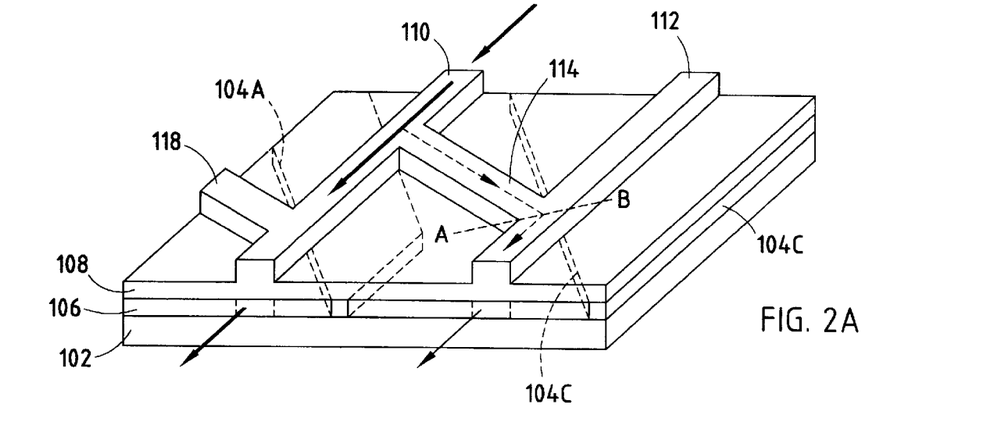
FIG. 2A is cross-sectional view of the isolator of FIG. 1, taken along the line II—II, illustrating the path of a first incident mode of an incident optical signal through a first mode splitter, according to an embodiment of the present invention.
Figure 2B:
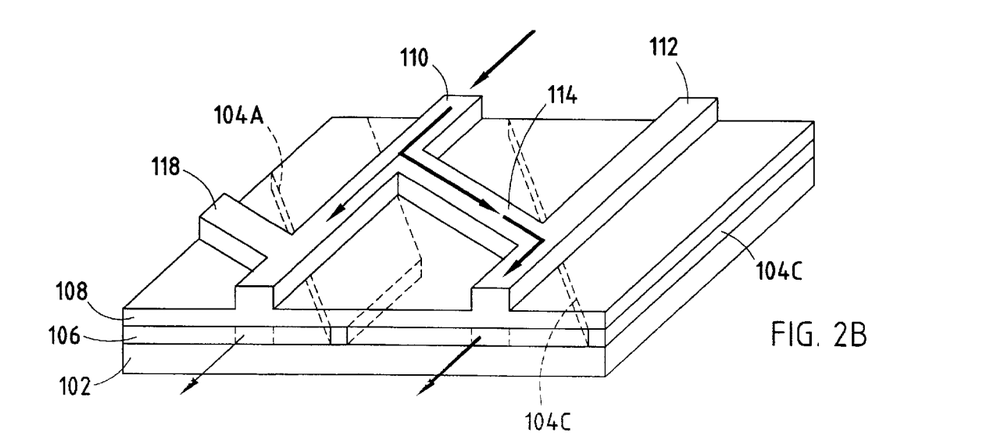
FIG. 2B is a cross-sectional view of the isolator of FIG. 1, taken along the line II—II, showing the path of a second incident mode of the incident optical signal through the first mode splitter.

A cross-sectional view of a portion (i.e., a first mode splitter) of the isolator 100 of FIG. 1 is shown in FIG. 2A. As is shown in FIG. 2A, a first incident mode (e.g., a TE mode) of an incident optical signal, that enters input port 111, travels through the core layer 106 following the first rib 110 toward the phase shift region 120. However, a leaky portion of the first incident mode follows the same path as the second incident mode. That is, the leaky portion follows the first crossover rib 114 and the second rib 112 and proceeds in the core layer 106 along the second rib 112 toward the phase shift region 120. As previously mentioned, the effective refractive index of the first MQW structure 104A, located at the intersection of the first rib 110 and the first crossover rib 114, is chosen so as to substantially pass the first incident mode (e.g., a TE mode) of the incident optical signal such that the first incident mode continues to follow the first rib 110. As is best shown in FIG. 2B, a second incident mode (e.g., a TM mode) of the incident optical signal, entering the input port 111, follows the first rib 110 until it encounters the first MQW structure 104A, located at the intersection of the first rib 110 and the first crossover rib 114, at which point the second incident mode follows the first crossover rib 114 as it travels through the core layer 106. As previously mentioned, this is due to effective refractive index of the first MQW structure 104A. Similarly, the second MQW structure 104C, located at the intersection of the first crossover rib 114 and the second rib 112 causes the second incident mode of the incident optical signal to be directed along the second rib 112 toward the phase shift region 120.

An exit rib 118 is connected to the first rib 110, between the phase shift region 120 and the first crossover rib 114. As will be described in more detail below, the first MQW structure 104A preferably extends to the intersection of the first rib 110 and the exit rib 118 so as to substantially redirect a second reflected mode along the exit rib 118 and away from the input port 111. Alternatively, another MQW structure may be located at the intersection of the first rib 110 and the exit rib 118, to direct the second reflected mode along the exit rib 118 and away from the input port 111.

Figure 3:
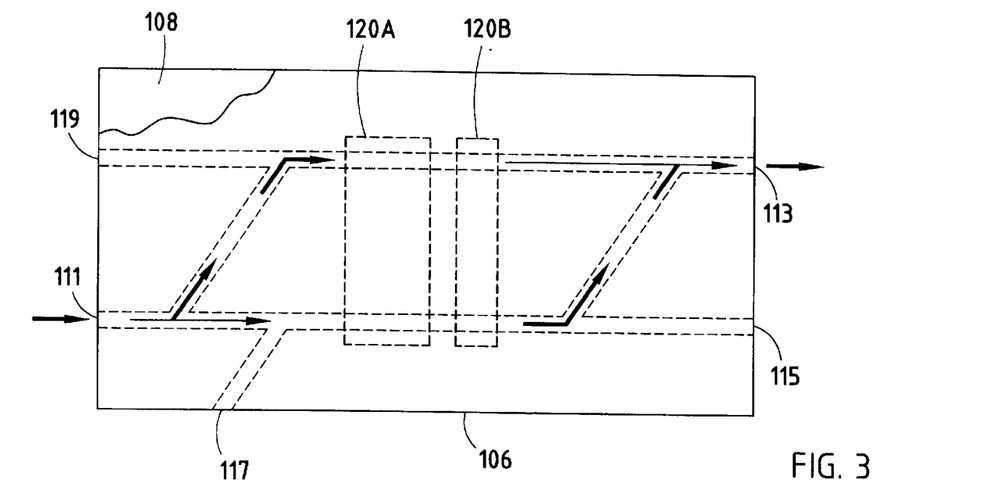
FIG. 3 is a top view of the isolator of FIG. 1, with a cladding layer removed, illustrating the travel of the components of an incident optical signal through a core layer of the isolator, according to the present invention.

FIG. 3 is a top view of the isolator 100 of FIG. 1 with the cladding layer 108, the magnet 122 and the polyimide halfwave plate 124 removed for clarity. FIG. 3 illustrates the paths taken by the first incident mode (e.g., a TE mode) and the second incident mode (e.g., a TM mode) of the incident optical signal. At the intersection of the first rib 110 and the first crossover rib 114, the modes of the incident optical signal are split (due to the refractive index of the first MQW structure 104A). As shown, the second incident mode is directed through the core layer 106 along the first crossover rib 114. The first incident mode continues to follow the rib 110 in the core layer 106. As previously discussed, the splitting of the first incident mode and the second incident mode is a result of the difference in the refractive index of the first MQW structure 104A and the core layer 106, as seen by the second incident mode. The first incident mode travels in the core layer 106 along the first rib 110 into the phase shift region 120. Upon exiting the phase shift region 120, the first incident mode is changed to a second rotated incident mode (e.g., a TM mode).

A third MQW structure 104B, located at the intersection of the first rib 110 and the second crossover rib 116, causes the second rotated incident mode to follow the second crossover rib 116 through the core layer 106. Upon encountering the fourth MQW structure 104D, the second rotated incident mode is directed along the second rib 112 toward the output port 113. Once again, this is due to the lower effective refractive index of the MQW structure 104D with respect to the refractive index of the core layer 106. As previously discussed, the first MQW structure 104A located at the intersection of the first rib 110 and the first crossover rib 114 substantially redirects the second incident mode such that it is guided by the first crossover rib 114 in the core layer 106. The second MQW structure 104C is located at the intersection of the first crossover rib 114 and the second rib 112 to substantially redirect the second incident mode such that it is guided by the second rib 112 in the core layer 106 toward the phase shift region 120 and ultimately to the output port 113. The second MQW structure 104C is designed such that it substantially passes a first reflected mode (e.g., a TE mode) of a reflected optical signal such that it is guided by the second rib 112 away from the input port 111.

Upon exiting the phase shift region 120, the second incident mode (e.g., a TM mode) becomes a first rotated incident mode (e.g., a TE mode). The first rotated incident mode and the second rotated incident mode are recombined at the intersection of the second crossover rib 116 and the second rib 112 such that the signals reform the incident optical signal at the output port 113, since the path length traveled by each of the modes is substantially the same.

Figure 4:
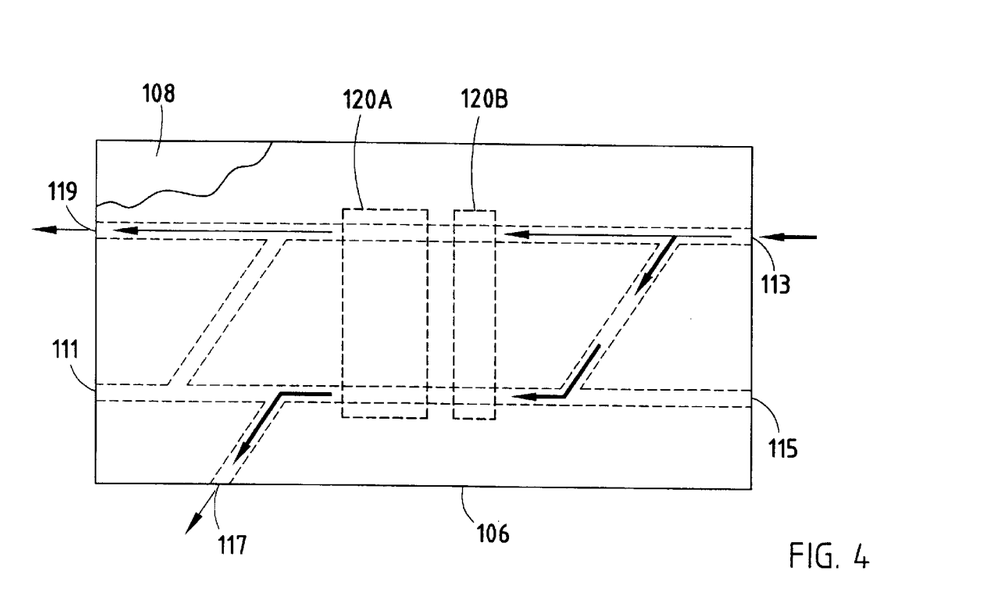
FIG. 4 is a top view of the isolator of FIG. 1, with the cladding layer removed, illustrating the travel of the components of a reflected optical signal through the core layer of the isolator, according to the present invention.

Moving to FIG. 4, the paths of the components of a reflected optical signal are illustrated. The reflected optical signal enters the output port 113 and follows the second rib 112 through the core layer 106. Upon encountering the fourth MQW structure 104D, the reflected optical signal is split into the first reflected mode (e.g., a TE mode) and a second reflected mode (e.g., a TM mode). The second reflected mode follows the second crossover rib 116 and the first reflected mode passes through the MQW structure 104D and is directed along the second rib 112 through the phase shift region 120. The second reflected mode encounters the MQW structure 104B at the intersection of the second crossover rib 116 and the first rib 110. The refractive index of the MQW structure 104B is such that the second reflected mode is directed toward the phase shift region 120 along the first rib 110 in the core layer 106. Unlike an incident optical signal, the mode of a reflected optical signal is not changed as it passes through the phase shift region 120. The refractive index of the MQW structure 104C is designed such that the first reflected mode signal passes through the MQW structure 104C and follows along the second rib 112 in the core layer 106 such that the first reflected mode exits the second rib exit port 119 located in the core layer 106 beneath a first end of the second rib 112. Similarly, a second reflected mode passes through the phase shift region 120 substantially unchanged, along the first rib 110, and upon encountering the first MQW structure 104A at the intersection of the exit rib 118 and the first rib 110 is substantially directed by the MQW structure 104A along the exit rib 118 and away from the input port 111.

Figure 5C:
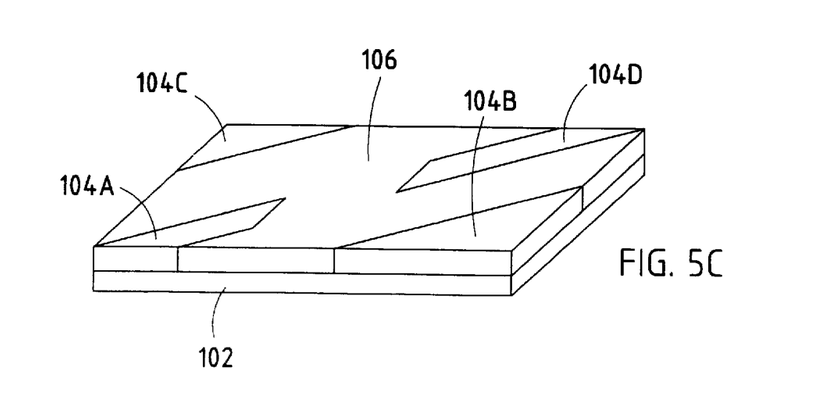
Figure 5D:
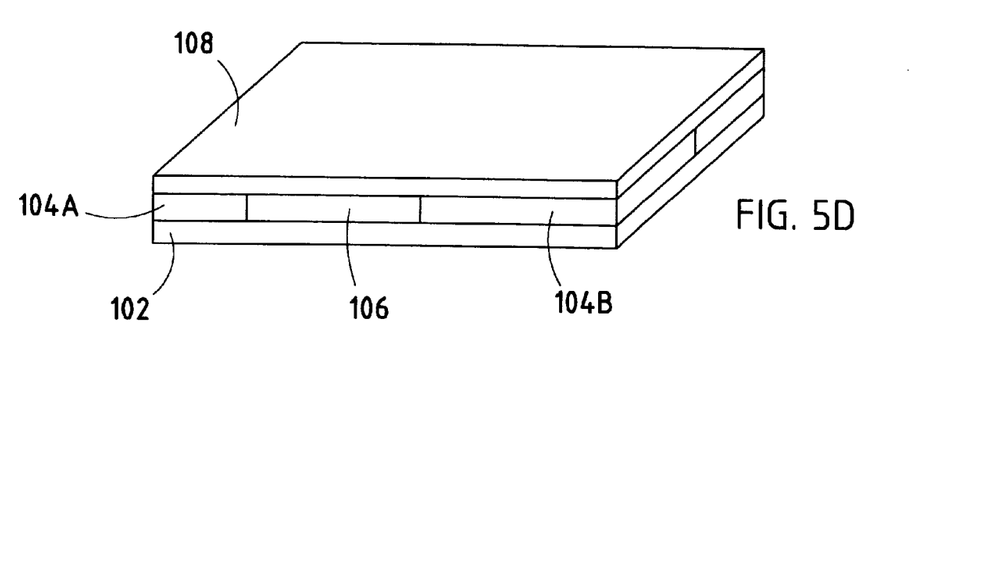
Figure 5E:
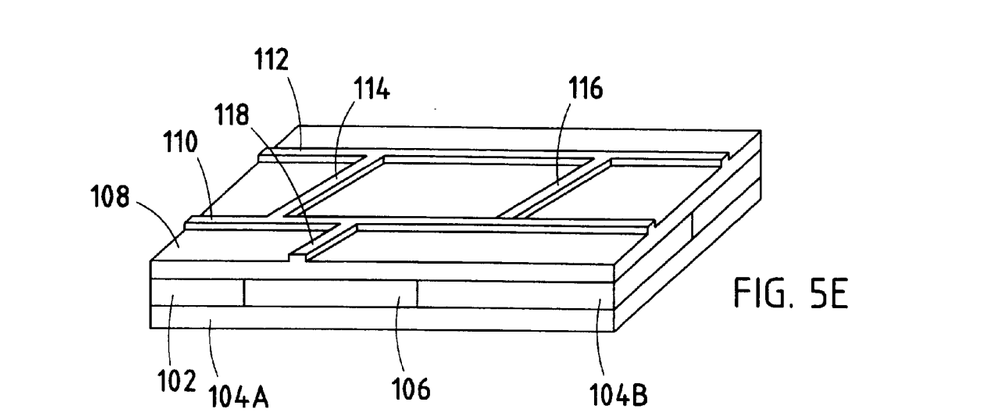

An exemplary fabrication process for the isolator 100 of FIG. 1 is shown pictorially in FIGS. 5A–5E. Initially, Ce:YIG and SiO$_2$ multilayer films are deposited on a GGG (alternatively, Sm$_3$Ga$_5$O$_{12}$(SGG) or Nd$_3$Ga$_5$O$_{12}$(NGG) may be utilized) substrate in a sputtering chamber (not shown) to form the MQW structures 104A–104D. Preferably, the sputtering chamber has at least two targets of which one is for the Ce:YIG deposition and the other is for the SiO$_2$ deposition. Preferably, the substrate 102 is heated by a resistive heater in a range of 550 to 750 degrees centigrade and the multilayer films are prepared without exposure to air by alternating the substrate 102 position at each target. During formation of the multilayer MQW structures 104A–104D, the areas for the nonreciprocal and compensating phase shifters (i.e., the phase shift region 120) are masked. Next, the multilayer films are partially removed by photolithography and etching techniques as shown in FIG. 5B. A suitable etching technique can be implemented with the magnetic neutral loop discharge (NLD) plasma technique, which generally provides a high etching rate compared with that of an ion beam sputtering method. It should be noted that the reactive ion etching (RIE) process is not generally effective at etching garnet films. A variety of suitable NLD plasma etchers are widely utilized in the semiconductor industry. As shown in FIG. 5C, the Ce:YIG film is then sputtered onto the etched areas. Next, as shown in FIG. 5D, a cladding layer (e.g., SiO$_2$) 108 is deposited by sputtering and, as is shown in FIG. 5E, the ribs are formed using photolithography techniques and NLD plasma etching. To achieve a nonreciprocal phase shift section, a magnet 122 is then formed (e.g., by gas phase deposition) on the area of the nonreciprocal phase shift section 120A and a polyimide halfwave plate 124 is buried into the core layer 106 to form the reciprocal phase shift section 120B. It should be appreciated that the magnet is required to saturate the underlying garnet film. It should also be appreciated that other materials, such as TiO$_2$, can be used as the cladding layer (providing $n_{core(MQW)} > n_{cladding}$ is maintained) and may enhance the nonreciprocity effect of a garnet waveguide. It is also contemplated that a latchable material can be utilized to achieve the nonreciprocal rotation effect, which obviates the need for a magnet. The substrate is preferably chosen such that ncore is greater than $n_{substrate}$.

Figure 6A:
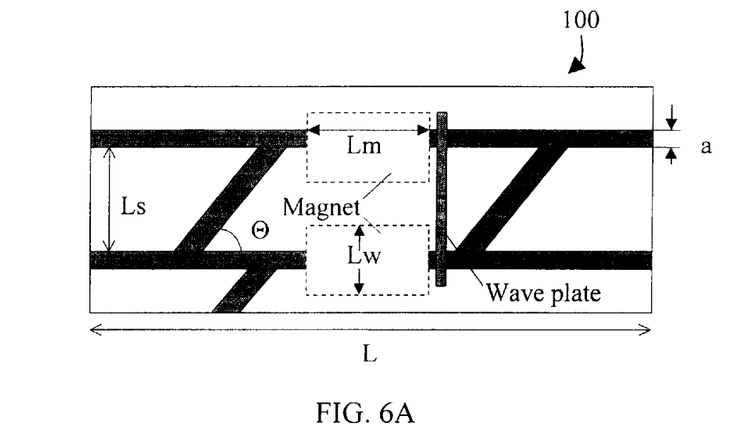
FIG. 6A is a top view of the isolator of FIG. 1 depicting various structural dimensions.
Figure 7:
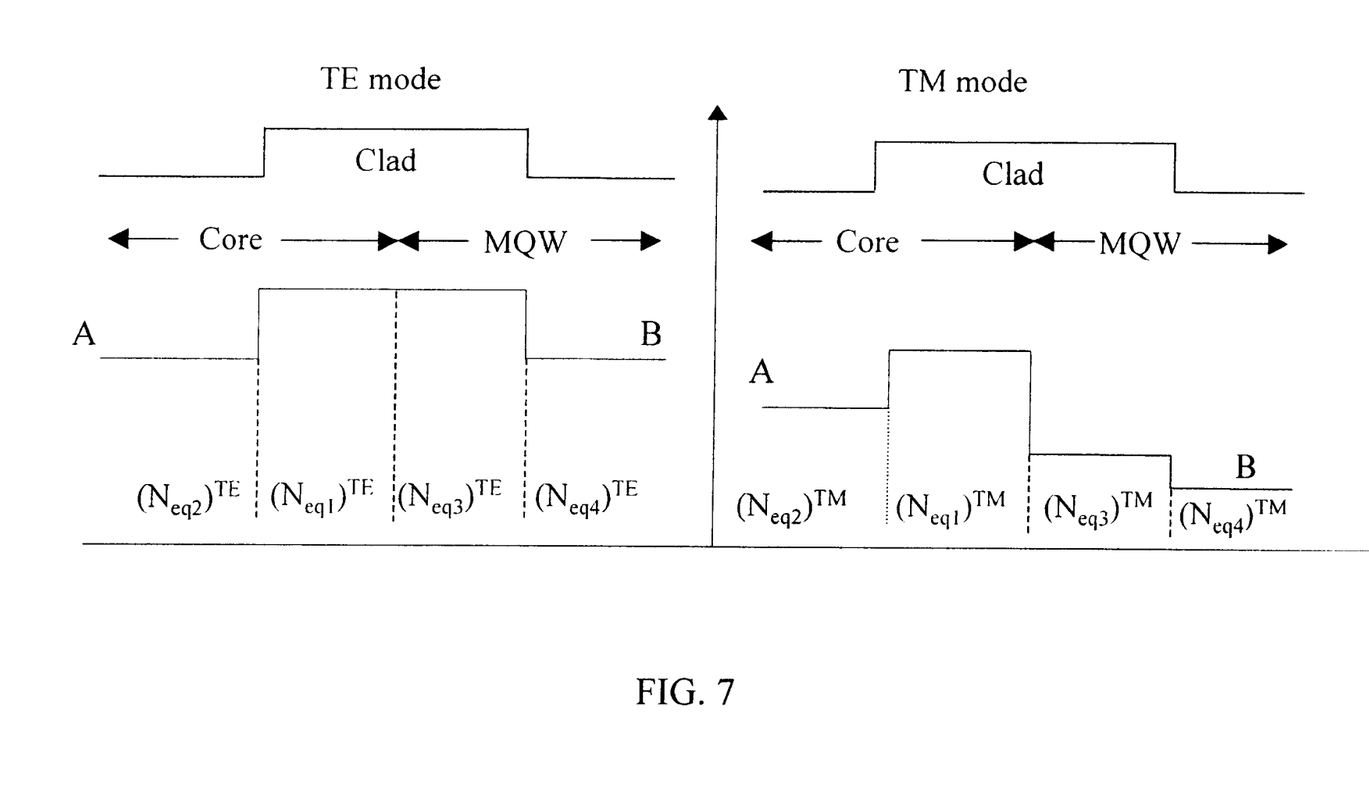
FIG. 7 is a diagram depicting the effective refractive indices of the materials along the line A-B for the TE and TM modes.

It should be understood that the structural dimensions and the materials of the planar-type optical isolator 100 of FIG. 1, as is further depicted in FIG. 6A, affect the optical properties of the isolator 100. Both the thicknesses and refractive indexes of the chosen materials that compose the layers of the MQW structures in the isolator 100 affect the choice of materials and dimensions for the other components. Several design equations are set forth below with reference to FIGS. 6A, 6B and 7. The structural birefringence, $\Delta N^m$, is defined as:

$$\Delta N^m = (N_{eq1}{}^m - N_{eq3}{}^m)/N_{eq1}{}^m$$

where $N_{eq}$ is the effective refractive index along the line A-B (see FIGS. 2A and 7). The waveguide relative refractive index difference, $\Delta w^m$, is defined as:

$$\Delta w^m = [(N_{eq1}{}^m)^2 - (N_{eq3}{}^m)^2]/(2N_{eq1}{}^m)^2$$

where m is either the TE or TM mode. The normalized frequency, $V_x{}^m$, is defined as:

$$V_x^m = \frac{2\pi}{\lambda} \frac{a}{2} N_{eq1}^m (2\Delta w^m)^{1/2}$$

where 'a' is the rib width, 'λ' is the wavelength, and 'm' is either the TE or TM mode.

Figure 6B:
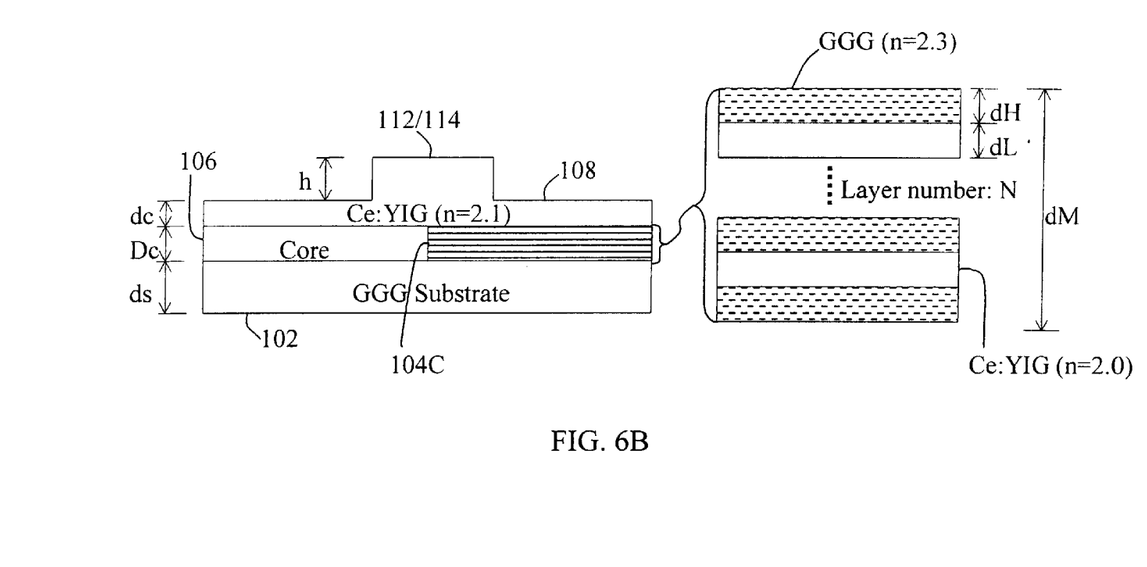
FIG. 6B is a cross-sectional view of the mode splitter of FIG. 2A taken along the line A-B, depicting various other structural dimensions.

To design a beam splitter, the structural parameter values of a MQW structure must be determined. That is, the isolator property (i.e., isolation) depends on the structural arameters of the MQW structure. The MQW structure, shown in FIG. 6B, is composed of two materials each having a different refractive index. Because a multi-layer composed of periodically laminated high-index and low-index layers (with a thickness less than approximately one-tenth compared with the operating wavelength) has a large optical anisotropy, all materials having high transparency at, for example, 1550 nanometers, are candidates as layers for a MQW structure. On the other hand, the effective refractive index profiles along the line A-B (see FIG. 2A) are preferably $(N_{eq1})^{TE} = (N_{eq3})^{TE}$, as shown in FIG. 7, in order to maximize cross-talk reduction in the beam splitter. It is desirable to maximize the reduction in cross-talk between modes by at least 40 dB to realize an isolation of greater than 40 dB. The condition $[(N_{eq1})^{TE} = (N_{eq3})^{TE}]$ is obtained by adjusting the thicknesses ('dH' and 'dL'), the refractive indexes ('nH' and 'nL') and the total layer thickness 'dM', which corresponds to the core thickness 'Dc', of the materials chosen for the MQW structure.

The MQW structure also provides a structural birefringence for the TM mode ($\Delta N^{TM}$), which is required to be large for achieving a large branching angle θ (see FIG. 6A) and is influenced by 'dH', 'dL', 'Δn', 'dM', 'N', and the cladding thickness including the rib height ('dc' plus 'h'). In general, an increase in 'Δn' and 'dM' and a decrease in 'N' are needed to get a large $\Delta N^{TM}$. The values of 'dM' and 'N' should be chosen to satisfy the single-mode condition for light passing into the beam splitter. Light passed in the core of the beam splitter has a tendency to propagate in multi-modes with increasing 'dM' and with decreasing 'N'.

Suitable structural parameters for a MQW structure can be achieved by using InP (low refractive index material: n=3.1694), $Ga_{0.4}In_{0.6}As_{0.86}P_{0.14}$ (high refractive index material: n=3.4975) and $Ga_{0.24}In_{0.76}As_{0.508}P_{0.492}$ (core layer material: n=3.3487). In this case, Δn=0.33, dH=28 nm, dL=25 nm, dM(Dc)=876 nm, N=33 layers, and $\Delta N^{TM}$= 0.1%.

Materials providing a Δn of 0.33 provide suitable parameter values for making a MQW structure. For example, a combination of Ce-substituted YIG (Ce:YIG [$Ce_xY_{3-x}Fe_5O_{12}$], x is determined to be n=2.0), GGG ($Gd_3Ga_5O_{12}$, n=2.3), and $Ce_xY_{3-x}Fe_5O_{12}$ (x is determined to be n=2.1) are available as a low-index material, a high-index material and a core layer, respectively. MQW structures composed of Ce:YIG/$SiO_2$ (Δn equal to 0.5–0.8) may also be realized.

A suitable value for the rib width 'a' is in the range of five to ten microns, which generally maximizes coupling efficiency with other devices. For achieving a rib width 'a' between five and ten microns, suitable values for the cladding layer thickness 'dc' and the rib height 'h' can be chosen with consideration for the waveguides refractive index difference ($\Delta w^m$). The refractive index of the cladding layer should be small compared with the refractive indexes of the core and the MQW structure. In the mode splitter/isolator, the values for 'dc' and 'h' should be chosen using the $\Delta w^{TM}$ value because the waveguide refractive index difference for the TM mode ($\Delta w^{TM}$) is larger than that for the TE mode when the values of 'dc' and 'h' are varied. A lower $\Delta w^{TM}$ value is desirable for maximum cross-talk reduction. The TM mode input at port 111 tends to propagate to the port 115 with an increasing $\Delta w^{TM}$ value. In the mode splitter/isolator, a $\Delta w^{TM}$ of one-tenth of one percent is desirable to attenuate cross-talk by at least 40 dB (however, when $\Delta w^{TM}$<0.1%, the value of the rib width 'a' becomes too large (e.g., >10 microns) to connect with many other devices). Therefore, 'dc' and 'h' values are preferably chosen with 'a' set to a range of about five to ten microns and $\Delta w^{TM}$ at about one-tenth of one percent. In general, thinner 'dc' and/or thicker 'h' yields a higher $\Delta w^{TM}$ value. Further, it is desirable that the normalized frequency value of light-propagation for direction x ($V_x^{TM}$) should be about 1.5 in order to maintain single-mode light propagation. For achieving an 'a' value of about five microns, a suitable value for 'dc' is about 117 nanometers and a suitable value for 'h' is about 55 nanometers, when the MQW structure is nP/$Ga_{0.4}In_{0.6}As_{0.86}P_{0.14}$, the core layer is $Ga_{0.24}In_{0.76}As_{0.508}P_{0.492}$ and an InP cladding layer is used. An isolator using a Ce:YIG/GGG MQW structure, a Ce:YIG-core layer (n=2.0) and a Ce:YIG-cladding layer (n=2.1) provides smaller values for 'dc' and 'h' compared to the above example. However, the ratio of 'dc' to 'h' is about the same value, i.e., approximately 2:1.

Based on Snell's law, the maximum total reflection angle $\theta_c$ in the beam splitter is defined below:

$$\theta_c = 2\cos^{-1}\left(\frac{N_{eq3}^{TM}}{N_{eq1}^{TM}}\right)$$

As discussed above, a suitable branching angle of seven degrees yields a cross-talk reduction greater than 40 dB. Values larger than about sixty percent of the maximum angle calculated from the above equation allow for mode splitting with cross-talk reduced by more than 40 dB. In general, the port separation distance 'Ls' (see FIG. 6A) should be greater than twenty microns to avoid mode coupling between the TE and TM modes. The total length of a beam splitter with a Ce:YIG/GGG MQW structure, a Ce:YIG core layer (n=2.1) and a Ce:YIG-cladding layer (n=2.0) with a branch angle of θ equal to seven degrees has a total isolator length of the sum of the lengths for the two mode splitters (about 850 microns) and the garnet waveguide length.

Iron garnet films, which having a general formula $Re_3Fe_5O_{12}$ (where Re can be Y, La, Bi and trivalent rare-earth ions and so on), are well known as magneto-optical (non-reciprocal) materials and are suitable as a core/waveguide material used in the planar-type optical isolator, described herein. Other materials having non-reciprocal property are also candidates for a core/waveguide layer. Typically, various garnet films with a single phase have been obtained by a liquid phase epitaxial (LPE) method and gas phase epitaxial processes. For example, $(BiY)_3Fe_5O_{12}$, $(LaGa)_3Fe_5O_{12}$, $(CeY)_3Fe_5O_{12}$, $(YbPrBi)_3(FeGa)_5O_{12}$, $(YBi)_3(FeGa)_5O_{12}$ and $(YBi)_3(FeAl)_5O_{12}$ have been proposed fo as a waveguide material in polarization-dependent planar isolators. However, only Bi- and Ce-substituted YIG (Bi:YIG and Ce:YIG) films are reported to be realized by gas phase deposition methods. In the fabrication of the planar-type optical isolator, described herein, utilization of a gas phase epitaxial process is generally necessary to form the garnet-film waveguide as a waveguide is buried between the mode splitters, which are fabricated on the same substrate. Garnet waveguides using Bi:YIG and Ce:YIG films are practical for the planar-type isolator, described herein. Ce:YIG films are preferred as they generally provide a large Faraday rotation angle (about 4000–5000 deg./cm). The length 'Lm' for achieving a Faraday rotation of about forty-five degrees, is approximately one-hundred microns, which advantageously allows for the realization of relatively short isolators. The preferred isolator, described herein, can generally be realized with a total device length of about 950 microns.

It is desirable to crystallize Ce:YIG films to achieve a large Faraday rotation angle. Therefore, substrates having almost the same lattice constant as those of Ce:YIG films are preferably used to provide crystallized Ce:YIG films. However, amorphous Ce:YIG (a-Ce:YIG) films on glasses (e.g., amorphous glasses) and/or other crystal substrates can be crystallized by annealing at a temperature in an $O_2$ atmosphere. Any substrate can be used if a crystallization temperature condition exists for the Ce:YIG film. A relatively important consideration for choosing a substrate is to satisfy the condition of $n_{core(MQW)} > n_{substrate}$. In order to integrate the isolator with a laser on the same substrate, a III–V compound substrate, which is the substrate for laser devices, is needed. In this case, materials for the core layer and MQW structure are chosen such that $n_{core(MQW)} > n_{III-V\ substrate}$. Another advantage of using Ce:YIG films is that they provide low insertion loss of about 0.06 to 0.45 dB per centimeter.

Preferably, the planar-type optical isolator, described herein, uses a thin film, such as a samarium-cobalt film magnet that exhibits strong in-plane c-axis alignment. The advantage of using a film-based magnet is that it can be deposited directly onto the cladding layer of the isolator. The magnet film is preferably deposited over the garnet waveguide for a distance 'Lm' of approximately one-hundred microns with a width 'Lw' between five to ten microns.

The half-wave plate 124 is preferably inserted into a trench fabricated in the waveguide of the isolator 100. Because a wider trench width generally leads to a larger diffraction loss, the trench width should typically be less than about thirty microns to achieve a diffraction loss less than 0.1 dB. Presently, only polyimide wave plates provided by NTT-AT (thickness is about sixteen microns) meet this criteria. An anti-reflection film may be deposited on the wave plate in order to reduce reflection between the trench facet and the wave plate. Alternatively, the trench may be fabricated at an angle (e.g., an eight degree angle) against the waveguide to reduce reflection.

Figure 8A:
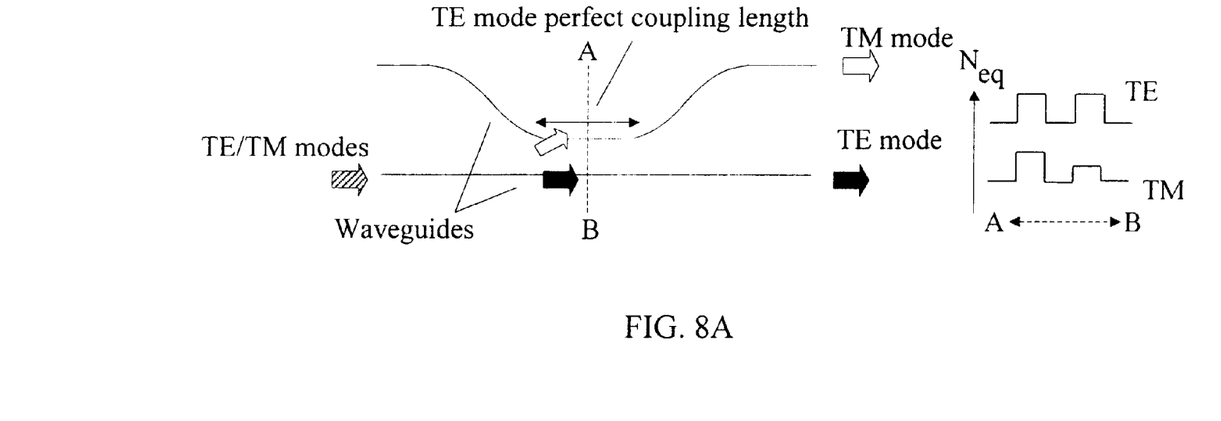
FIGS. 8A–8B are diagrams depicting the splitting of the TE and TM modes by a directional coupler and a Y-branch type mode splitter, respectively.
Figure 8B:
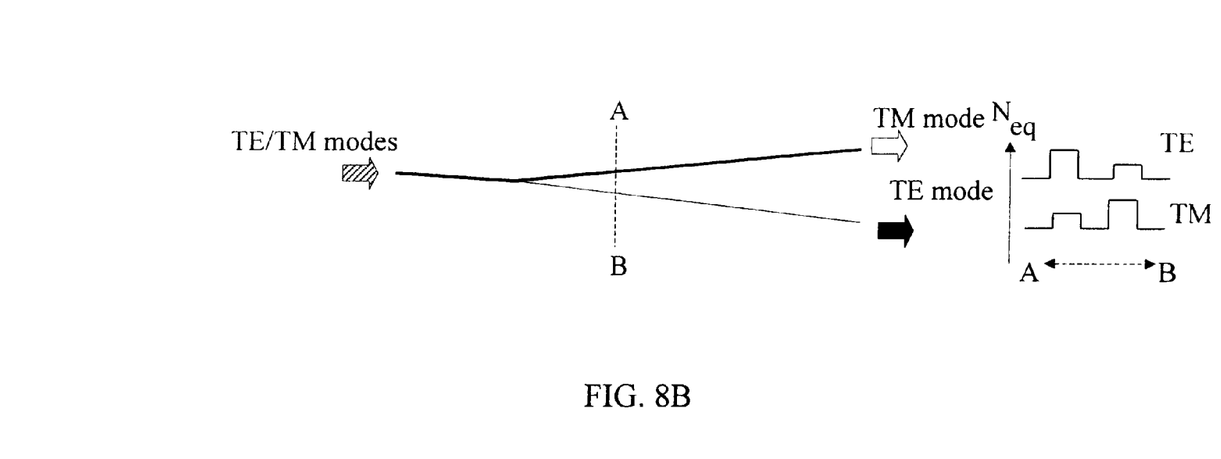

In general, two types of mode splitters have been used. A first mode splitter is a directional coupler type and a second mode splitter is a Y-branch type. In the directional coupler type, the TE/TM mode split is conducted by using a difference of a perfect coupling length between TE and TM modes (FIG. 8A). The device length of a directional coupler is larger than that of its perfect coupling length and may be larger than several tens of millimeters. On the other hand, the Y-branch type mode splitters realize TE/TM mode splitting by using non-symmetrical waveguides having different refractive indices for TE and TM modes (FIG. 8B). Branch angles θ of these mode splitters have been reported to be less than one degree, which provides a total device length of several millimeters to several tens of millimeters. As discussed above, the length of the mode splitter used in the isolator, described herein, is shorter compared with those of other mode splitters due to its large branch angle, while simultaneously reducing cross-talk by at least about 40 dB.

Accordingly, a planar-type optical isolator has been described that includes a substrate, a first mode splitter formed on the substrate, a second mode splitter formed on the substrate and a phase shift region formed on the substrate between the first mode splitter and the second mode splitter. The planar-type optical isolator provides polarization independent optical isolation with low insertion loss in a relatively small device footprint.

It will become apparent to those skilled in the art that various modifications to the preferred embodiment of the invention as described herein can be made without departing from the spirit or scope of the invention as defined by the appended claims.

The invention claimed is:

1. A planar-type optical isolator, comprising:
   a substrate;
   a first mode splitter formed on the substrate, the first mode splitter receiving an incident optical signal through an input port and splitting the incident optical signal into a first incident mode and a second incident mode;
   a second mode splitter formed on the substrate, wherein the second mode splitter combines a first rotated incident mode and a second rotated incident mode to reform the incident optical signal at an output port, and wherein the second mode splitter receives a reflected optical signal on the output port and splits the reflected optical signal into a first reflected mode and a second reflected mode; and
   a phase shift region formed on the substrate between the first mode splitter and the second mode splitter, wherein the phase shift region includes a nonreciprocal phase shift section and a reciprocal phase shift section, the phase shift region passing the reflected optical signal without altering its modes while causing the first incident mode to become the second rotated incident mode and the second incident mode to become the first rotated incident mode, and wherein the first mode splitter directs the first reflected mode and the second reflected mode away from the input port.

2. The isolator of claim 1, wherein the isolator further includes:
   a plurality of multiple quantum well (MQW) structures formed on the substrate;
   a core layer formed on the substrate, the core layer separating the plurality of MQW structures, the core layer including the phase shift region;
   a cladding layer formed on the plurality of MQW structures and the core layer, the cladding layer including:
     a first rib for guiding at least a portion of the incident optical signal and the reflected optical signal through at least a portion of the core layer, wherein the input port is located in the core layer beneath a first end of the first rib and a first rib exit port is located in the core layer beneath a second end of the first rib;
     a second rib for guiding at least a portion of the incident optical signal and the reflected optical signal through at least a portion of the core layer, wherein a second rib exit port is located in the core layer beneath a first end of the second rib and an output port is located in the core layer beneath a second end of the second rib;
     a first crossover rib connecting the first and second ribs on a first side of the phase shift region, wherein a first MQW structure at the intersection of the first rib and the first crossover rib substantially redirects the second incident mode such that it is guided by the first crossover rib and substantially passes the first incident mode such that it is guided by the first rib, and wherein a second MQW structure at the intersection of the second rib and the first crossover rib substantially redirects the second incident mode such that it is guided by the second rib toward the output port and substantially passes the first reflected mode such that it is guided by the second rib away from the input port;

a second crossover rib connecting the first and second ribs on a second side of the phase shift region which is opposite the first side, the phase shift region passing the reflected optical signal without altering its modes while causing the first incident mode to become the second rotated incident mode and the second incident mode to become the first rotated incident mode, wherein a third MQW structure at the intersection of the first rib and the second crossover rib substantially redirects the second rotated incident mode such that it is guided by the second crossover rib and substantially redirects the second reflected mode such that it is guided by the first rib toward the input port, and wherein a fourth MQW structure at the intersection of the second rib and the second crossover rib substantially redirects the second rotated incident mode such that it is guided by the second rib toward the output port to combine with the first rotated incident mode to reform the incident optical signal and substantially redirects the second reflected mode such that it is guided by the second crossover rib toward the first rib and passes the first reflected mode such that it is guided by the second rib toward the input port; and an exit rib connected to the first rib on the first side of the phase shift region between the phase shift region and the first crossover rib, wherein the first MQW structure extends to the intersection of the first rib and the exit rib so as to substantially redirect the second reflected mode along the exit rib and away from the input port.

3. The isolator of claim 2, wherein the first rib and the second rib are substantially parallel.

4. The isolator of claim 3, wherein the first crossover rib and the second crossover rib are substantially parallel.

5. The isolator of claim 2, wherein a branching angle between the first crossover rib and the first and second ribs is in a range of about five to ten degrees, and wherein the branching angle between the second crossover rib and the first and second ribs is in a range of about five to ten degrees.

6. The isolator of claim 2, wherein the substrate is a gadolinium gallium garnet (GGG) substrate, the core layer is a cerium yttrium iron garnet (Ce:YIG) layer and each of the MQW structures includes multiple alternating Ce:YIG layers and silicon oxide ($SiO_2$) layers.

7. The isolator of claim 6, wherein the cladding layer is one of silicon oxide ($SiO_2$) and titanium oxide ($TiO_2$).

8. The isolator of claim 2, wherein the nonreciprocal phase shift section includes a magnet placed adjacent the cladding.

9. The isolator of claim 2, wherein the reciprocal phase shift section is created by a polyimide halfwave plate that is incorporated within the core layer.

10. The isolator of claim 1, wherein the first incident mode, the first reflected mode and the first rotated incident mode are transverse electric (TE) modes and the second incident mode, the second reflected mode and the second rotated incident mode are transverse magnetic (TM) modes.

11. A planar-type optical isolator, comprising:

a substrate;

a plurality of multiple quantum well (MQW) structures formed on the substrate;

a core layer formed on the substrate, the core layer separating the plurality of MQW structures, the core layer including a phase shift region that includes a nonreciprocal phase shift section and a reciprocal phase shift section;

a cladding layer formed on the plurality of MQW structures and the core layer, the cladding layer including:

a first rib for guiding at least a portion of an incident optical signal and a reflected optical signal through at least a portion of the core layer, wherein the incident optical signal includes a first incident mode and a second incident mode and the reflected optical signal includes a first reflected mode and a second reflected mode, and wherein an input port is located in the core layer beneath a first end of the first rib and a first rib exit port is located in the core layer beneath a second end of the first rib;

a second rib for guiding at least a portion of the incident optical signal and the reflected optical signal through at least a portion of the core layer, wherein a second rib exit port is located in the core layer beneath a first end of the second rib and an output port is located in the core layer beneath a second end of the second rib;

a first crossover rib connecting the first and second ribs on a first side of the phase shift region, wherein a first MQW structure at the intersection of the first rib and the first crossover rib substantially redirects the second incident mode such that it is guided by the first crossover rib and substantially passes the first incident mode such that it is guided by the first rib, and wherein a second MQW structure at the intersection of the second rib and the first crossover rib substantially redirects the second incident mode such that it is guided by the second rib and substantially passes the first reflected mode;

a second crossover rib connecting the first and second ribs on a second side of the phase shift region which is opposite the first side, the phase shift region passing the reflected optical signal without altering its modes while causing the first incident mode to become a second rotated incident mode and the second incident mode to become a first rotated incident mode, wherein a third MQW structure at the intersection of the first rib and the second crossover rib substantially redirects the second rotated incident mode such that it is guided by the second crossover rib and substantially redirects the second reflected mode such that it is guided by the first rib toward the input port, and wherein a fourth MQW structure at the intersection of the second rib and the second crossover rib substantially redirects the second rotated incident mode such that it is guided by the second rib toward the output port to combine with the first rotated incident mode to reform the incident optical signal and substantially redirects the second reflected mode of the reflected optical signal such that it is guided by the second crossover rib toward the first rib and passes the first reflected mode such that it is guided by the second rib away from the output port; and an exit rib connected to the first rib on the first side of the phase shift region between the phase shift region and the first crossover rib, wherein the first MQW structure extends to the intersection of the first rib and the exit rib so as to substantially redirect the second reflected mode along the exit rib and away from the input port.

12. The isolator of claim 11, wherein the first rib and the second rib are substantially parallel.

13. The isolator of claim 12, wherein the first crossover rib and the second crossover rib are substantially parallel.

14. The isolator of claim 11, wherein a branching angle between the first crossover rib and the first and second ribs is in a range of about five to ten degrees, and wherein the branching angle between the second crossover rib and the first and second ribs is in a range of about five to ten degrees.

15. The isolator of claim 11, wherein the substrate is a gadolinium gallium garnet (GGG) substrate, the core layer is a cerium yttrium iron garnet (Ce:YIG) layer and each of the MQW structures includes multiple alternating Ce:YIG layers and silicon oxide ($SiO_2$) layers.

16. The isolator of claim 15, wherein the cladding layer is one of silicon oxide ($SiO_2$) and titanium oxide ($TiO_2$).

17. The isolator of claim 11, wherein the nonreciprocal phase shift section is created by an external magnet placed adjacent the cladding.

18. The isolator of claim 11, wherein the reciprocal phase shift section is created by a polyimide halfwave plate that is incorporated within the core layer.

19. The isolator of claim 11, wherein the first incident mode, the first reflected mode and the first rotated incident mode are transverse electric (TE) modes and the second incident mode, the second reflected mode and the second rotated incident mode are transverse magnetic (TM) modes.

20. A method for providing optical isolation, comprising the steps of:
   providing a substrate;
   providing a first mode splitter formed on the substrate, the first mode splitter receiving an incident optical signal through an input port and splitting the incident optical signal into a first incident mode and a second incident mode;
   providing a second mode splitter formed on the substrate, wherein the second mode splitter combines a first rotated incident mode and a second rotated incident mode to reform the incident optical signal at an output port, and wherein the second mode splitter receives a reflected optical signal on the output port and splits the reflected optical signal into a first reflected mode and a second reflected mode; and
   providing a phase shift region formed on the substrate between the first mode splitter and the second mode splitter, wherein the phase shift region includes a nonreciprocal phase shift section and a reciprocal phase shift section, the phase shift region passing the reflected optical signal without altering its modes while causing the first incident mode to become the second rotated incident mode and the second incident mode to become the first rotated incident mode, and wherein the first mode splitter directs the first reflected mode and the second reflected mode away from the input port.

21. The method of claim 20, further including the steps of:
   providing a plurality of multiple quantum well (MQW) structures formed on the substrate;
   providing a core layer formed on the substrate, the core layer separating the plurality of MQW structures, the core layer including the phase shift region;
   providing a cladding layer formed on the plurality of MQW structures and the core layer, the cladding layer including:
      a first rib for guiding at least a portion of the incident optical signal and the reflected optical signal through at least a portion of the core layer, wherein the input port is located in the core layer beneath a first end of the first rib and a first rib exit port is located in the core layer beneath a second end of the first rib;
      a second rib for guiding at least a portion of the incident optical signal and the reflected optical signal through at least a portion of the core layer, wherein a second rib exit port is located in the core layer beneath a first end of the second rib and an output port is located in the core layer beneath a second end of the second rib;
      a first crossover rib connecting the first and second ribs on a first side of the phase shift region, wherein a first MQW structure at the intersection of the first rib and the first crossover rib substantially redirects the second incident mode such that it is guided by the first crossover rib and substantially passes the first incident mode such that it is guided by the first rib, and wherein a second MQW structure at the intersection of the second rib and the first crossover rib substantially redirects the second incident mode such that it is guided by the second rib toward the output port and substantially passes the first reflected mode such that it is guided by the second rib away from the input port;
      a second crossover rib connecting the first and second ribs on a second side of the phase shift region which is opposite the first side, the phase shift region passing the reflected optical signal without altering its modes while causing the first incident mode to become the second rotated incident mode and the second incident mode to become the first rotated incident mode, wherein a third MQW structure at the intersection of the first rib and the second crossover rib substantially redirects the second rotated incident mode such that it is guided by the second crossover rib and substantially redirects the second reflected mode such that it is guided by the first rib toward the input port, and wherein a fourth MQW structure at the intersection of the second rib and the second crossover rib substantially redirects the second rotated incident mode such that it is guided by the second rib toward the output port to combine with the first rotated incident mode to reform the incident optical signal and substantially redirects the second reflected mode such that it is guided by the second crossover rib toward the first rib and passes the first reflected mode such that it is guided by the second rib toward the input port; and
      an exit rib connected to the first rib on the first side of the phase shift region between the phase shift region and the first crossover rib, wherein the first MQW structure extends to the intersection of the first rib and the exit rib so as to substantially redirect the second reflected mode along the exit rib and away from the input port.

22. The method of claim 21, wherein the first rib and the second rib are substantially parallel.

23. The method of claim 22, wherein the first crossover rib and the second crossover rib are substantially parallel.

24. The method of claim 21, wherein a branching angle between the first crossover rib and the first and second ribs is in a range of about five to ten degrees, and wherein the branching angle between the second crossover rib and the first and second ribs is in a range of about five to ten degrees.

25. The method of claim 21, wherein the substrate is a gadolinium gallium garnet (GGG) substrate, the core layer is a cerium yttrium iron garnet (Ce:YIG) layer and each of the MQW structures includes multiple alternating Ce:YIG layers and silicon oxide ($SiO_2$) layers.

26. The method of claim 25, wherein the cladding layer is one of silicon oxide ($SiO_2$) and titanium oxide ($TiO_2$).

27. The method of claim 21, wherein the nonreciprocal phase shift section is created by an external magnet placed adjacent the cladding.

28. The method of claim 21, wherein the reciprocal phase shift section is created by a polyimide halfwave plate that is incorporated within the core layer.

29. The method of claim 20, wherein the first incident mode, the first reflected mode and the first rotated incident mode are transverse electric (TE) modes and the second incident mode, the second reflected mode and the second rotated incident mode are transverse magnetic (TM) modes.

* * * * *